US011941522B2

United States Patent
Zhang et al.

(10) Patent No.: US 11,941,522 B2
(45) Date of Patent: Mar. 26, 2024

(54) ADDRESS INFORMATION FEATURE EXTRACTION METHOD BASED ON DEEP NEURAL NETWORK MODEL

(71) Applicant: ZHEJIANG UNIVERSITY, Hangzhou (CN)

(72) Inventors: Feng Zhang, Hangzhou (CN); Ruichen Mao, Hangzhou (CN); Zhenhong Du, Hangzhou (CN); Liuchang Xu, Hangzhou (CN); Huaxin Ye, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 776 days.

(21) Appl. No.: 17/033,988

(22) Filed: Sep. 28, 2020

(65) Prior Publication Data
US 2021/0012199 A1    Jan. 14, 2021

Related U.S. Application Data

(63) Continuation of application No. PCT/CN2019/097375, filed on Jul. 23, 2019.

(30) Foreign Application Priority Data

Jul. 4, 2019 (CN) .......................... 201910600447.5

(51) Int. Cl.
G06N 3/08 (2023.01)
G06F 16/29 (2019.01)
G06N 7/01 (2023.01)

(52) U.S. Cl.
CPC ............... *G06N 3/08* (2013.01); *G06F 16/29* (2019.01); *G06N 7/01* (2023.01)

(58) Field of Classification Search
CPC ............ G06N 3/08; G06N 7/01; G06F 16/29
See application file for complete search history.

(56) References Cited

U.S. PATENT DOCUMENTS

2016/0140434 A1   5/2016  Yilmaz et al.

FOREIGN PATENT DOCUMENTS

| CN | 107729311 A | 2/2018 |
| CN | 108399421 A | 8/2018 |

(Continued)

OTHER PUBLICATIONS

Sharma, S., et al., Automated Parsing of Geographical Addresses: A Multilayer Feedforward Neural Network based approach, Retrieved from Internet :<https://ieeexplore.ieee.org/abstract/document/8334449> (Year: 2018).*
Cao, P., et al., Adversarial Transfer Learning for Chinese Named Entity Recognition with Self-Attention Mechanism, Retrieved from Internet:<https://aclanthology.org/D18-1017/> (Year: 2018).*
Devlin, J., et al., BERT: Pre-training of Deep Bidirectional Transformers for Language Understanding, Retrieved from Internet:<https://arxiv.org/abs/1810.04805> (Year: 2018).*

(Continued)

*Primary Examiner* — Miranda M Huang
*Assistant Examiner* — Bart I Rylander
(74) *Attorney, Agent, or Firm* — W&G Law Group

(57) ABSTRACT

The present disclosure discloses an address information feature extraction method based on a deep neural network model. The present disclosure uses a deep neural network architecture, and transforms tasks, such as text feature extraction, address standardization construction and semantic-geospatial fusion, into quantifiable deep neural network model construction and training optimization problems. Taking a character in an address as a basic input unit, the address language model is designed to express it in vectors, then a key technology of standardization construction of Chinese addresses is realized through neural network target tasks. Moreover, considering expression features of the Chinese addresses and geospatial attributes, a fusion scheme of address semantic representations and geographical coordinates is proposed, and a weighted clustering method and (Continued)

a feature fusion model are designed, to extract, from an address text of a natural language, a fusion vector syncretic with semantic features and spatial features.

9 Claims, 6 Drawing Sheets

(56) References Cited

FOREIGN PATENT DOCUMENTS

| | | |
|---|---|---|
| CN | 109492679 A | 3/2019 |
| CN | 109783817 A | 5/2019 |

OTHER PUBLICATIONS

Melo, F., et al., Automated Geocoding of Textual Documents: A Survey of Current Approaches, Retrieved from Internet: <https://onlinelibrary.wiley.com/doi/full/10.1111/tgis.12212> (Year: 2017).*
JP Decision to Grant a Patent (2020-556939); dated Feb. 22, 2022.
Semantically Conditioned Dialog Response Generation via Hierarchical Disentangled Self-Attention; Date of Mailing: May 30, 2019.
Adversarial Transfer Learning for Chinese Named Entity Recognition with Self-Attention Mechanism; Date of Mailing: 2018.
International Search Report (PCT/CN2019/097375); dated Mar. 26, 2020.

* cited by examiner

ADDRESS INFORMATION FEATURE EXTRACTION METHOD BASED ON DEEP NEURAL NETWORK MODEL

TECHNICAL FIELD

The present disclosure relates to the field of address information mining of a geographic information system (GIS), and in particular, to an address information feature extraction method based on a deep neural network model.

BACKGROUND

With the continuous improvement of GIS awareness and application capabilities, address information has gradually become core resources in the era of smart cities, and semantic and spatial connotations carried in its content are basic support for construction of a geographic ontology and a temporal-spatial semantic framework in smart cities. Making a computer start from a perspective of understanding an address text and deeply extract comprehensive features of Chinese addresses and form quantitative expressions in numerical form has important theoretical values and practical significance for fusion and understanding of urban semantics and geospatial content. However, for the current theoretical research centered on unstructured text management or address coding, due to inability to dig deep into feature connotations of the address text, it faces outstanding problems such as information islands, additional data dependence, and weak generalization during task processing, which limits use of address data in the field of smart cities.

Deep learning methods represented by deep neural networks can make full use of computer processing performance and have super-strong parameter calculation and fitting capabilities for nonlinear problems. In the field of natural language processing, neural network language models are based on the deep neural networks and can express semantic features of characters, words, sentences and even articles in a form of high-dimensional vectors. However, as a specialized natural language, addresses can be well combined with the current language model, to construct an address language model that conforms to grammatical rules and meanings of the addresses, making it an effective way to express the semantic features of the address text.

The Chinese addresses have characteristics of large data volume and dense geospatial distribution within a city. Moreover, in order to more accurately express the semantic features of Chinese addresses, the dimensionality of a semantic feature vector of the address text is quite high. An improved K-means algorithm is an unsupervised clustering method and has characteristics of simple logic, high operating efficiency, fast convergence speed, strong algorithm interpretability, few adjustment parameters, and suitable for big data and high-dimensional clustering, and the number of clusters can be set with reference to distribution of functional areas within the range, so that the result is more in line with human logic, making it suitable for the application of semantic-geospatial fusion clustering of address text.

With the in-depth application of transfer learning in the field of natural language processing, the current neural network language model has begun to support development of fine-tuning tasks from designing of the neural network structure, which is convenient for users to carry out neural network transformation of downstream tasks based on their general model instances, and a core is to migrate neural network nodes in a trained model to a new network structure. Compared to a traditional way of retraining the model, this method has significant advantages in terms of data requirements, training time and practical effects, such that result information output by the model includes a fusion weight of a fine-tuning target, and solution of the target task is realized.

SUMMARY

An object of the present disclosure is to overcome the problems existing in the related art and provide a deep neural network model for Chinese addresses information feature extraction.

An object of the present disclosure is achieved through following technical solutions.

Provided is an address information feature extraction method based on a deep neural network model, and the method includes steps of:

S1: constructing a word embedding module weighted by a position order, for expressing, through a position coding algorithm and a built-in matrix variable, each address character in an input address text in a form of a unique-value vector, to achieve conversion of address information from text to code;

S2: constructing a feature extraction module for character encoding, and obtaining, through a semantic extraction method of a multi-head self-attention mechanism, comprehensive semantic output of a character element in different semantic spaces;

S3: constructing a target task module that predicts unknown characters based on context, and outputting, under a condition of satisfying that the address character and the context represent a mapping relationship, a conditional probability distribution of predicted characters required by the training task;

S4: connecting the word embedding module in the step S1, the feature extraction module in the step S2 and the target task module in the step S3 in sequence, to form an address language model, and training the Chinese addresses language model using a natural language training program based on a random masking strategy, such that the model can output and obtain a semantic feature vector of each character in the address text;

S5: fusing the semantic feature vectors of all the characters in the address text, obtaining a sentence vector through a pooling method of the address semantic features, performing high-dimensional weighting in combination with position information, and obtaining a semantic-geospatial fusion clustering result through a K-Means clustering method;

S6: transplanting the word embedding module and the feature extraction module in the address language model trained and completed in the step S4, to form an encoder; reconstructing, based on a neural network fine-tuning theory, the target task module, to form a decoder, for using the clustering result in the step S5 as an address text label, to assigning a semantic-geospatial fusion weight to a neural network parameter variable in the encoder; and S7: combining the encoder and the decoder to construct a geospatial-semantic address model and training the geospatial-semantic address model, such that the model can output the fusion vector expression of the semantic and spatial features for the address text.

Based on the above solution, each of the steps can be implemented in the following specific ways.

Preferably, in the step S1, a specific execution flowchart in the word embedding module includes steps of:
S11: creating a dictionary-vector conversion matrix C;
S12: getting an index char_index of each of the address characters in the input address text in the dictionary;
S13: obtaining a one-hot vector of each of the characters according to the index, and a length of the vector being a size of the dictionary;
S14: multiplying the one-hot vector with the Lookup Table, to obtain a word embedding value $embedding_0$ of each of the characters;
S15: obtaining a position position of each of the characters in the address text;
S16: obtaining a position weight vector of each of the characters according to the position coding algorithm; wherein a position weight vector PW of each of the characters is composed of position weight values of all dimensions;
a position weight value of an even-numbered dimension is:

$$PW(\text{position}, i \mid i \%2 = 0) = \sin\left(\text{position} / 10000^{\frac{i}{d_{model}}}\right)$$

a position weight value of an odd-numbered dimension is:

$$PW(\text{position}, i \mid i \%2 = 1) = \sin\left(\text{position} / 10000^{\frac{i-1}{d_{model}}}\right)$$

where, $d_{model}$ represents a dimension of word embedding $embedding_0$, and i represents an i-th dimension that is calculated; and
S17: adding the position weight vector and the word embedding value of each of the characters, to obtain a character vectorization expression content of each of the characters weighted by the position sequence:

$$embedding = embedding_0 + PW$$

Preferably, in the step S2, a specific execution flowchart in the feature extraction module includes steps of:
S21: inputting the character vectorization expression content output by the word embedding module in the step S1 into a neural network formed by series connection of multiple layers of self-transformer sub-modules; in each layer of the self-transformer sub-module, input data is first substituted into the self-attention neural network, output thereof undergoes residual connection and normalization calculations and then is substituted into a feed forward network layer, and then undergoes another residual connection and normalization calculation and then serves as output of the self-transformer sub-module; and
S22: in the other self-transformer sub-modules except a first layer of self-transformer sub-module, output of a previous layer of self-transformer sub-module serving as input of a next layer of self-transformer sub-module, transferring layer by layer, until output $SA^N$ of the last layer of self-transformer sub-module is obtained.

Preferably, in the step S3, a specific execution flowchart in the target task module includes steps of:
S31: using output of the feature extraction module in the step S2 as input of the feed forward network layer, transforming, through nonlinear transformation, it into "corrected word embedding" information prob_embedding where each of the characters has been affected by the context, and a nonlinear transformation formula is:

$$\text{prob\_embedding} = g(W \times SA + b)$$

where g ( ) represents a ReLu function, W represents a weight matrix, and b represents linear offset;
S32: performing a linear transformation on prob_embedding, to obtain its probability distribution score:

$$\text{logits} = C^T \times \text{prob\_embedding} + b'$$

where the weight matrix C is the transposition of the dictionary-vector conversion matrix C, and b' represents offset of the linear transformation; and
S33: substituting the probability distribution score logits into a softmax activation function to finally obtain the conditional probability distribution where each of the characters is a respective word in the dictionary.

$$\text{prob} = \text{softmax}(\text{logits})$$

Preferably, a specific implementation flowchart of the step S4 includes steps of:
S41: connecting the word embedding module in the step S1, the feature extraction module in the step S2, and the target task module in the step S3 in sequence, to form an address language model;
S42: constructing a training framework for the address language model, and in the training framework, first defining the natural language training program based on the random masking strategy, then constructing the dictionary and model input of the training data, then defining a loss function and optimizing the model parameter variables by constructing a neural network optimizer; and
S43: training the address language model based on the training framework, such that the model can output semantic feature vector expression of each of the characters in the address text.

Furthermore, in the step S42, the natural language training program based on a random masking strategy specifically includes:
randomly masking some characters in the input address sequence, and representing by masking symbols; then replacing a part of the masking symbols in the address sequence with real characters, replacing another part of the masking symbols in the address sequence with wrong characters, and keeping the rest of the masking symbols unchanged; in the training process of the address language model, the target task module being only executed on the three kinds of characters replaced by the masking symbols;
wherein in the neural network optimizer, three gradient update optimization strategies, which are learning rate decay, clip by global norm, and adaptive moment estimation, can be adopted.

Preferably, a specific implementation process of the step S5 includes steps of:
S51: obtaining output $SA^N$, $SA^{N-1}$, $SA^{N-2}$, $SA^{N-3}$ of the address text from the last four layers of the self-transformer sub-modules in the feature extraction module, and performing average pooling and max pooling on $SA^N$, $SA^{N-1}$, $SA^{N-2}$, $SA^{N-3}$ respectively, then adding all pooling results to obtain final semantic feature expression $sentEmbed_0$ of the address text.
S52: calculating a Euclidean distance range sent_range of all the address texts in a semantic feature vector space and a Euclidean distance range coor_range in a geo-spatial feature vector space, respectively;

performing a dimension-removing operation on the semantic feature vector $sentEmbed_0$ and the geospatial feature vector $coorEmbed_0$ of each of the address sequence, and weighting, through setting a weight value λ, the dimension-removed feature vectors, to obtain the processed semantic feature vector sentEmbed and geospatial feature vector coorEmbed:

$$sentEmbed = sentEmbed * \frac{sent\_range}{coor\_range} * l$$

$$coorEmbed = coorEmbed * (1 - l)$$

directly concatenating the processed two kinds of feature vectors, to form a fusion feature vector:

concatEmbed={sentEmbed,coorEmbed}

S53: cluster all the fusion feature vectors through the K-Means clustering algorithm in combination with Elkan distance calculation optimization algorithm, Mini-Batch K-means strategy and K-means++ clustering center initialization scheme, so as to obtain a semantic-geospatial fusion clustering result.

Preferably, a specific implementation process of the step S6 includes steps of:

S61: transplanting the word embedding module and the feature extraction module in the address language model trained in the step S4, and connecting the two to form an encoder;

S62: reconstructing a target task module that is used to classify the address text as a decoder, for generating a probability distribution for output of the encoder through the neural network; in the decoder, first, performing average pooling on output $SA^N$ of the last layer of self-transformer sub-module of the feature extraction module in the encoder, and the pooling result serving as a semantic feature of the address sentence; then performing, through the feed forward network layer, nonlinear transformation on the semantic feature of the address sequence, to convert the semantic feature into the probability distribution feature of a classification problem, wherein an activation function uses tanh; finally converting, through a fully-connected-layer, the obtained probability distribution feature into probability score distribution of the address text, and the predicted probability distribution P (B|W) of the address text belonging to each cluster obtained in the step S5 from the softmax function.

Preferably, a specific implementation process of the step S7 includes steps of:

S71: connecting the encoder and the decoder, to obtain the geospatial-semantic address model; and S72: constructing a training framework for the geospatial-semantic address model, and training the geospatial-semantic address model based on the training framework, such that the model can output fusion vector expression of the semantic and geospatial features for the address sequence.

Another object of the present disclosure is to provide a method for predicting a geographic position of an address sequence, and the method includes steps of:

first, constructing an address coordinate prediction model; wherein the address coordinate prediction model includes three consecutive fully-connected-layers and a linear transformation layer, an geospatial-semantic address model is obtained based on the method according to claims 1-9, and the output $SA^N$ of the last layer of self-transformer sub-module of the feature extraction module is pooled by a pooling layer and then is sequentially input into the three consecutive fully-connected-layers and the linear transformation layer, and the predicted coordinates of the spatial entity described by the output address text is output; and then inputting the address sequence of the geographic position to be predicted into the trained address coordinate prediction model, to obtain the predicted coordinates of the geospatial entity described by the address text.

Compared with the related art, the present disclosure has beneficial effects:

(1) The present disclosure utilizes superior fitting and calculation capabilities of modern artificial intelligence methods, converts the feature expression tasks of the address text into the structural design and training problem of the deep neural network, innovates the research methods of the address information, and provides new ideas for the processing and application of the Chinese addresses data. However, there is no relevant research on Chinese address text feature extraction in the related art.

(2) The present disclosure combines the multi-head self-attention mechanism, the position weighting algorithm, and the unknown character prediction task to design the address language model ALM. The model structure and the training framework are complete and have self-adjusting abilities, and accurate fitting and efficient calculation of the model parameter variables can be realized, to efficiently extract the semantic features of the addresses.

(3) The present disclosure reuses the ALM structure and the related neural network output, designs address text sentence vector expression, introduces the K-Means clustering theory, provides a high-dimensional clustering fusion method for the address information, to improve the disadvantages of traditional spatial clustering where the address semantics cannot be generalized, to achieve semantic-geospatial weighted address element segmentation; moreover, it refers to the deep neural network model fine-tuning theory, designs the geospatial-semantic address model GSAM, and carries out the realization of the target task of the model based on the clustering result, so that it has the comprehensive generalization ability of the features of the two.

DESCRIPTION OF EMBODIMENTS

The present disclosure will be further described in detail below with reference to the accompany drawings and specific embodiments.

Address texts and geospatial positions corresponding thereto are the basic data of urban construction, and unified modeling of address information and outputting it as numerical results help to unify development of downstream tasks. However, the address text is a specialized natural language text and cannot be directly understood by a computer, so it is necessary to use a language model to extract useful feature information. An essence of the language model is to measure a possibility of appearance of a sentence, and a core idea is to predict, according to a series of leading words at the front in the sentence, probability distribution of which word is followed. Aiming at a dilemma of insufficient information feature expression, in-depth data construction work, and limited application scenarios in existing research on Chinese addresses, an idea of the present disclosure is: comprehensively using a deep neural network architecture of an artificial intelligence method, to transform the tasks, such as text feature extraction, Chinese addresses standardization construction and semantic space fusion, into quantifiable deep neural network model construction and training optimization problems. Taking characters in the address as basic input units, a language model is designed to express it in vectors. On this basis, a key technology of the standardization construction of the addresses is realized through neural network target tasks. Moreover, considering geospatial attributes of the addresses, a feature fusion scheme of address semantic-geospatial is proposed, a weighted clustering method and feature fusion model is designed, and a purpose of this model is to extract, from the address text of the natural language, a fusion vector syncretic with the semantic feature and a spatial feature. The present disclosure will specifically describe the technical solution below.

Figure 1:
FIG. 1 is a flowchart of an address information feature extraction method based on a deep neural network model of the present disclosure.

As shown in FIG. 1, an address information feature extraction method based on a deep neural network model, including following steps:

S1: constructing a word embedding module weighted by a position order, for expressing, through a position coding algorithm and a built-in matrix variable, each address character in an input address text in a form of a unique-value vector, to achieve conversion of address information from text to code;

S2: constructing a feature extraction module for character encoding, and obtaining, through the semantic extraction method of a multi-head self-attention mechanism, comprehensive semantic output of a character element in different semantic spaces;

S3: constructing a target task module that predicts unknown characters based on context, and outputting, under a condition of satisfying that the address character and the context represent a mapping relationship, a conditional probability distribution of predicted characters required by the training task;

S4: connecting the word embedding module in S1, the feature extraction module in S2 and the target task module in S3 in sequence, to form the address language model (ALM), and using a natural language training program based on a random masking strategy to train the address language model, such that the model can output and obtain the semantic feature vector of each character in the address text;

S5: fusing the semantic feature vectors of all the characters in the address text, obtaining a sequence vector through a pooling method of the address semantic features, and performing high-dimensional weighting in combination with geospatial position information, to obtain a semantic-geospatial fusion clustering result through a K-Means clustering method;

S6: transplanting the word embedding module and the feature extraction module in the address language model trained and completed in S4, to form an encoder; reconstructing, based on a neural network fine-tuning theory, the target task module, to form a decoder, for using the clustering result in S5 as an address text label, to assigning a semantic-geospatial fusion weight to a neural network parameter variable in the encoder; and S7: combining the encoder and the decoder to construct a geospatial-semantic address model (GSAM), and training the geospatial-semantic address model, such that the model can output the fusion vector expression of the semantic and geospatial features for the address text.

The specific implementation process of the foregoing steps in the present disclosure will be described in detail below.

A character vectorization expression is a basis of the model, information covered by the character initialization expression determines an effect of subsequent network development. Traditional word embedding does not have weight of the position information, which will lead to a result that an influence of each word on the target character is independent of the position during the semantic feature extraction, which is not in line with understanding of the text by the human brains, so it is necessary to embed the position information. The present disclosure is implemented by the word embedding module in step S1, and a specific execution flowchart in the word embedding module in step S1 is described in detail below:

S11: creating a dictionary-vector conversion matrix (Lookup Table) C.

S12: getting an index char_index of each of the address characters in the input address text in the dictionary.

S13: obtaining a one-hot vector of each of the characters according to the index, and a length of the vector being a size of the dictionary:

$$\text{one\_hot} = \Big(\underbrace{0, 0, \ldots, 0, 1}_{char\_index}, 0, \ldots 0, 0\Big)$$

S14: multiplying the one-hot vector with the Lookup Table, to obtain a word embedding value embedding$_0$ of each of the characters:

embedding$_0$=C×one_hot

S15: obtaining a position position of each of the characters in the address text; the position represents a character serial number of the character in the address text.

S16: obtaining a position weight vector of each of the characters according to the position coding algorithm; the position weight vector PW of each of the characters is composed of position weight values of all dimensions, so the weight values of all the dimensions need to be calculated and combined to form the PW. Calculation formulas for an odd-numbered dimension and an even-numbered dimension are different, which are respectively as follows:

The position weight value of the even-numbered dimension is:

$$PW(\text{position}, i \mid i \, \%2 = 0) = \sin\Big(\text{position} \Big/ 10000^{\frac{i}{d_{model}}}\Big)$$

The position weight value of the odd-numbered dimension is:

$$PW(\text{position}, i \mid i \ \%2 = 1) = \sin\left(\text{position}/10000^{\frac{i-1}{d_{model}}}\right)$$

where, $d_{model}$ represents the dimension of word embedding embedding$_0$, and i represents the calculated i-th dimension. The dimension of PW of each of the characters is kept consistent with the dimension of embedding$_0$.

S17: adding the position weight vector and the word embedding value of each of the characters, to obtain a character vectorization expression content of each of the characters weighted by the position sequence:

$$\text{embedding} = \text{embedding}_0 + PW.$$

It can be seen that the word embedding module constructed in step S1 can not only implement the weighting of the position sequence of the character, but also consider relative positions between the characters, which is more conducive to the subsequent network development. The character vectorization expression information extracted by the word embedding module needs to perform the feature vector extraction in the feature extraction module of S2. The feature extraction module can deeply dig into a language environment where the characters are located, realize refining of the character semantics, and output the semantic feature in the form of the numerical vector. In the present disclosure, the feature extraction module constructs the semantic feature deep neural network structure of the language model based on the multi-head self-attention mechanism, so as to realize a precise semantic expression of the address text.

In step S2, a specific execution flowchart in the feature extraction module is as follows:

S21: inputting the character vectorization expression content output by the word embedding module in S1 into a neural network formed by series connection of multiple layers of self-transformer sub-modules. In each layer of the self-transformer sub-module, input data is first substituted into the self-attention neural network, output thereof undergoes residual and normalization calculations and then is substituted into a feed forward network layer, and then undergoes another residual and normalization calculation, and then serves as output of the self-transformer sub-module.

S22: in the other self-transformer sub-modules except a first layer of self-transformer sub-module, output of a previous layer of self-transformer sub-module serving as input of a next layer of self-transformer sub-module, transferring layer by layer, until output $SA^N$ of the last layer of self-transformer sub-module is obtained.

It can be seen that a core of the feature extraction module is the self-transformer sub-module. In order to explain the implementation of each self-transformer sub-module more clearly, its specific structure is described in detail below. According to the foregoing description, each self-transformer sub-module actually encapsulates a multi-head self-attention neural network framework layer, a residual network-batch normalization layer, a feed forward network layer, and a residual network-batch normalization layer, and these will be explained one by one below.

(1) Constructing a Text Self-Attention Neural Network Framework.

The essence of the self-attention comes from an attention mechanism of human visual observation of the text, and taking a specific character in the text as an example, humans need to refer to its interconnection with other characters to understand its semantics, so a specific realization idea of the self-attention mechanism can be expressed as: assigning weights to influences of all the characters in the sentence on the word, and comprehensively determining the semantic feature of the word by combining the weight with a content of the character itself.

The essence of the address text is a sentence describing the address, each of the characters in the sentence is represented by 3 feature vectors, namely Query (Q), Key (K), Value (V), and they are calculated and obtained by multiplying the word embedding vector X of the character by three weight matrices $W^Q$, $W^K$, $W^V$, whereas the weight matrices are obtained through the neural network training. A calculation flowchart of the attention content of a character l is as follows:

first, the word embedding vectors of all the characters of the input sentence can be obtained from the word embedding module in step S1, and the Q, K, V vectors q, k, v of each of the characters are obtained by calculating.

Calculating a score of l with all the characters.

$$\text{score}^1 = q^l \cdot k^1, \text{score}^2 = q^l \cdot k^2, \ldots, \text{score}^n = q^l \cdot k^n$$

In order to stabilize a gradient during the training, the score value is normalized, where $d^k$ is the dimension of the vector k:

$$\text{score} = \frac{\text{score}}{\sqrt{d^k}}$$

performing softmax normalization output on all the score values:

$$\text{score} = \text{softmax}(\text{score})$$

$$\text{softmax}(z)_j = e^{z_j} / \Sigma_{k=1}^K e^{z_k}$$

multiplying each of the score values by the corresponding v vector, to get a weighted evaluation of each of the characters on the word:

$$\text{eva} = \text{score} \cdot v$$

adding the weighted evaluations of all the characters on the word, to get the semantic feature expression of the word:

$$sa = \sum_{i=1}^{n} eva^i$$

in an actual process, the above calculation processes are all completed by matrix operations, which can be expressed as:

$$Q = W^Q \times \text{embedding}$$

$$K = W^K \times \text{embedding}$$

$$V = W^V \times \text{embedding}$$

$$SA = \text{softmax}\left(\frac{Q \times K^T}{\sqrt{d^k}}\right) \cdot V$$

However, this method can only obtain information of one kind of semantic space, and the multi-head self-attention mechanism developed on this basis is to map the feature vector, which was originally mapped only once, multiple times, to obtain the Q, K, V under multiple semantic sub-spaces, then perform attention value-taking operations on them respectively, and splice results, to finally obtain the self-attention expression of the character in a comprehensive semantic space.

The above multi-head self-attention method is encapsulated into a single neural network layer and named the multi-head self-attention neural network framework layer (MSA layer), and in order to better improve the effect of the semantic feature extraction, the present disclosure uses multiple MSA layers to extract the address semantics in a form of layered overlay.

(2) Residual Network-Batch Normalization Layer

Since an actual meaning of the output semantic $s_A$ is the influence of the characters of the full text on each of the characters, a calculation process thereof inevitably has errors in semantic extraction, so if the character semantics are expressed in this, then as the number of network layers increases, information loss will occur when low-layer features are transmitted to high-layers, and the error will also increase step by step along therewith, to present a degradation of semantic expression. In order to avoid the degradation of the semantics of information transmission between the MSA layers, a residual network layer neural network structure is introduced, and the output of the MSA layer needs to undergo residual connection and normalization calculations in the residual network-batch normalization layer. Taking output of the multi-head attention layer of the l-th layer as an example, a core idea is expressed as formulas below:

$$SA^l = SA^{l-1} + F(SA^{l-1})$$

$$SA^0 = X$$

SAM represents the output of the previous layer, the F function represents a processing method of the multi-head attention, and $SA^0$ is initially incoming word embedding information. After the output of each of the MSA layers, the information of the previous layer is added, to be syncretic with the self-attention semantics and the text embedding information, and a batch normalization (BN) operation is performed on a result, to facilitate calculation for the next time after the result information is transmitted, to avoid disappearance of the gradient during the training (a case where multi-step back propagation causes an error gradient to approach 0).

(3) Feed Forward Network Layer

In addition, since the output result is a vector splicing result obtained by calculation of the self-attention head, there will be a problem of disordered data space, so a feed forward network layer (fully connected neural network) is required to perform nonlinear transformation on the result together with the activation function ReLU, to make the semantics be output in a sequential and meaningful form. Then, the output result is input into the residual network-batch normalization layer again for being performed with the residual and normalization operation once.

Figure 2:
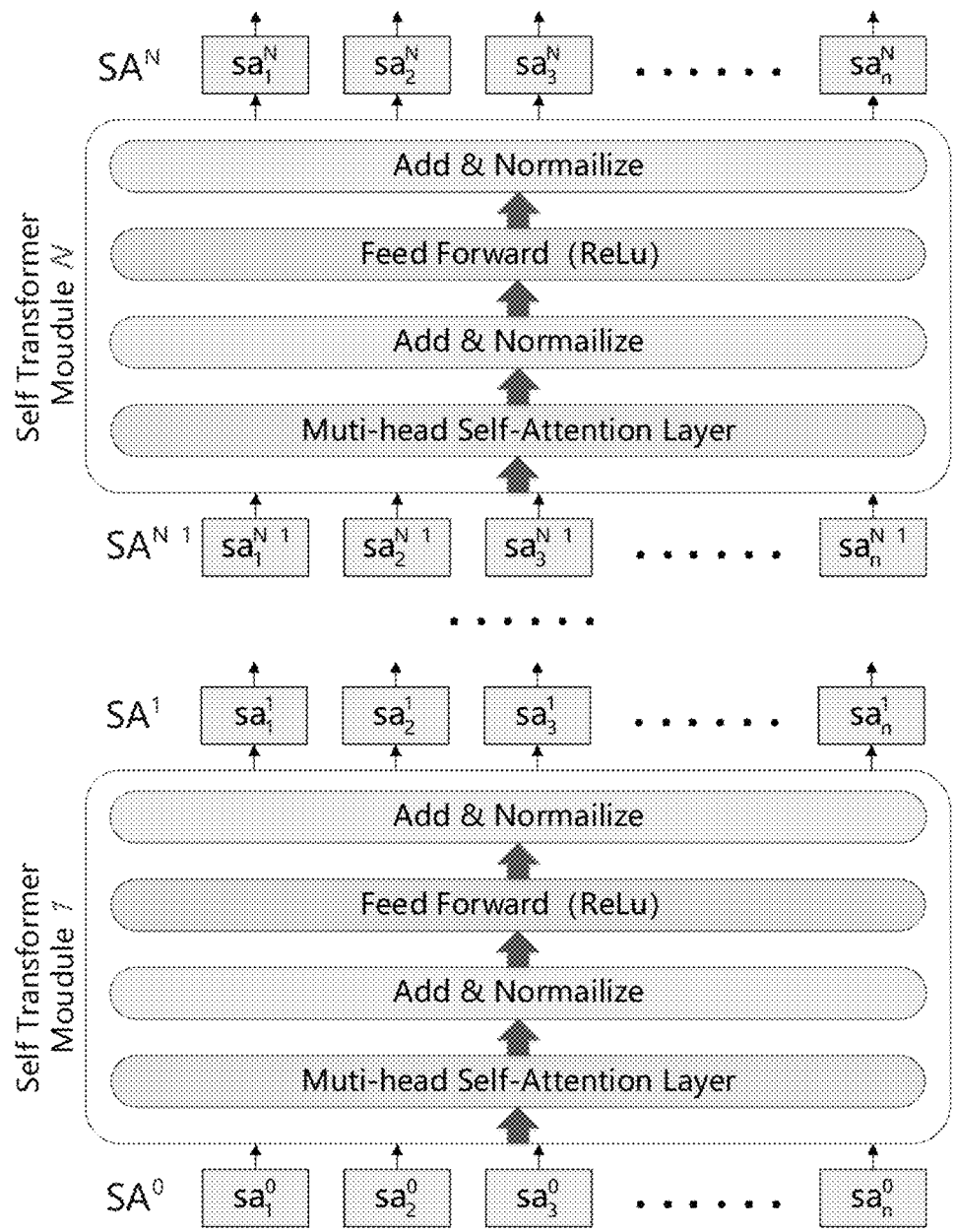
FIG. 2 is a structural diagram of a feature extraction module.

Therefore, in the present disclosure, the MSA layer-the residual network-the batch normalization layer-the feed forward network layer-the residual network-the batch normalization layer are combined into the self-transformer sub-module (Self-Transformer Moudule). The final neural network structure is composed of a plurality of the Self-Transformer Moudules superimposed in sequence, and its overall structure is shown in FIG. 2

The target task module (Target Module) immediately follows the semantic feature extraction module, in the present disclosure, it can be understood that the input of the module is the output of the Self-Transformer Module after being superimposed, and it is known that the input contains the semantic feature information of each of the characters in the address sequence.

Based on the above conditions, the present disclosure proposes a target task of predicting unknown characters based on the context, and a specific content thereof is:

assuming that a certain character in the sentence is unknown, and other contexts are known.

$$W = \{w_1, w_2, \ldots, w_{i-1}, w_i(\text{unknow}), w_{i+1}, \ldots, w_n\}$$

where: $w_j$ represents the j-th character (j≠i) in the sentence of the address text, and $w_i$(unknow) means that the i-th character in the sentence of the address text is the unknown character.

Through the known context, an occurrence probability of the unknown character is predicted, and it is written as a following conditional probability expression:

$$P(x_i | x_1, x_2, \ldots, x_{i-1}, x_{i+1}, \ldots, x_n)$$

substituting the address text content into the word embedding module and the feature extraction module, to obtain semantic feature information of the context of the final character:

$$SA = \{sa_1, sa_2, \ldots, sa_{i-1}, sa_i, sa_{i+1}, \ldots sa_n\}$$

$sa_i$ expresses the weight of the context on the character $x_i$, and here, $sa_i$ can be used to express the influence of the full text on the character, then the conditional probability expression can be approximated as follows:

$$P(x_i | x_1, x_2, \ldots, x_{i-1}, x_{i+1}, \ldots, x_n) \approx P(x_i | sa_i)$$

Based on this target task, the present disclosure designs a target task neural network structure to predict the characters based on context. In step S3, a specific execution flowchart in the target task module is as follows:

S31: using the output of the feature extraction module in S2 as the input of the feed forward network layer, transforming, through the nonlinear transformation, it into "corrected word embedding" information prob_embedding where each of the characters has been affected by the context, to prepare for calculation of character probabilities based on the Lookup Table. A nonlinear transformation formula is:

$$\text{prob\_embedding} = g(W \times SA + b)$$

in the formula: g ( ) represents the ReLu function, W represents the weight matrix, and b represents linear offset;

S32: constructing a fully-connected-layer, and performing a linear transformation on prob_embedding, to realize the linear transformation from "correction word embedding" to the probability distribution score, to obtain its probability distribution score:

$$\text{logits} = C^T \times \text{prob\_embedding} + b'$$

where the weight matrix Cr is the transposition of the dictionary-vector conversion matrix C, and b' represents offset of the linear transformation;

S33: substituting the probability distribution score logits into a softmax activation function to finally obtain the conditional probability distribution where each of the characters is a respective word in the dictionary.

prob=softmax(logits)

An advantage of this target task module is that it takes into account the contextual semantic of the character, and it conforms to the mapping relationship represented by word-context realized by the semantic feature extraction module.

Figure 3:
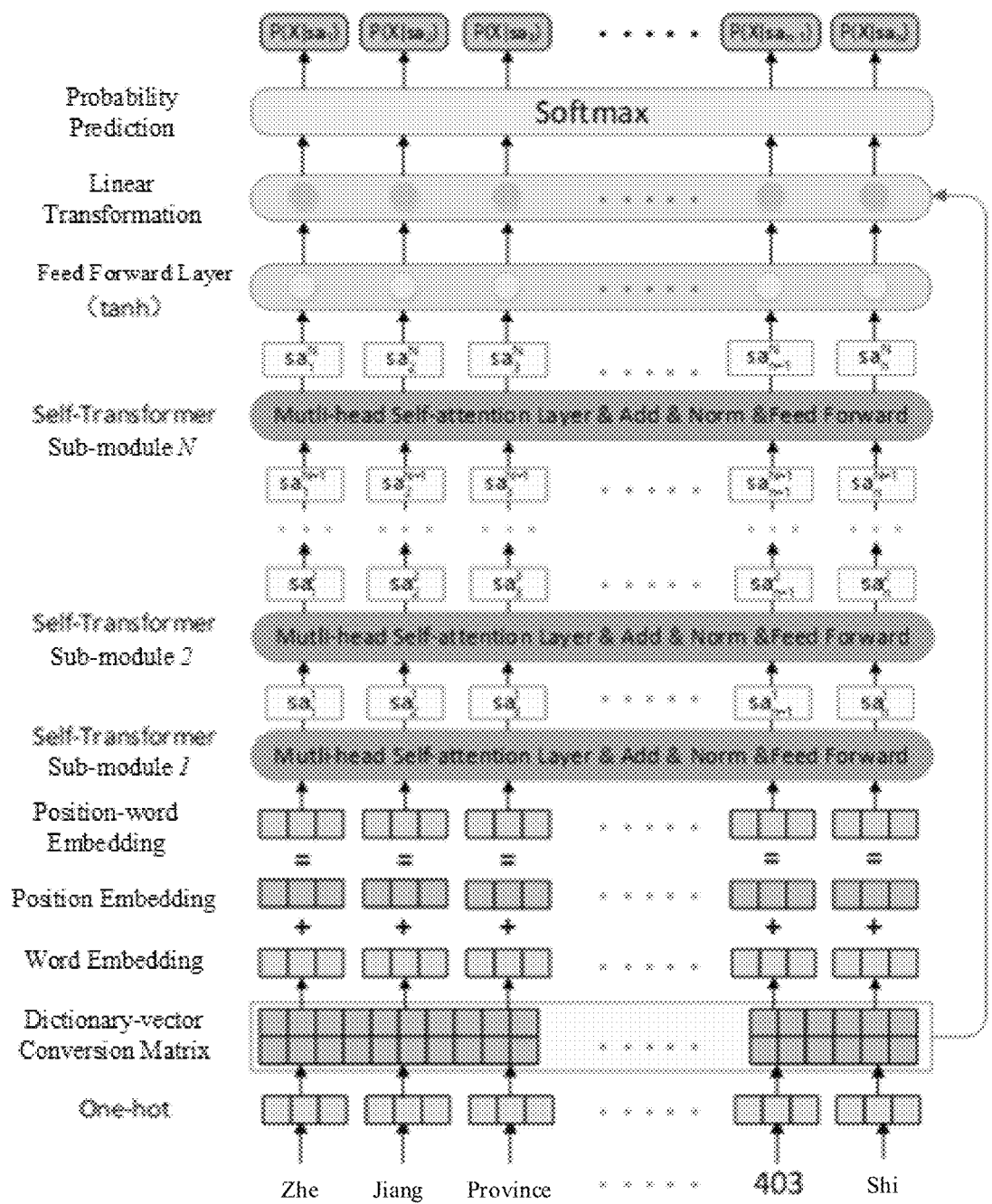
FIG. 3 is a structural diagram of the address language model (ALM) of the present disclosure.

After completing the construction of the above three modules, the address language model (ALM) can be constructed and trained. In the present disclosure, a specific implementation flowchart of the step S4 includes:

S41: connecting the word embedding module in S1, the feature extraction module in S2, and the target task module in S3 in sequence, to form a complete structure of the address language model ALM, as shown in FIG. 3.

S42: constructing a training framework for the address language model, in the training framework, first defining the natural language training program based on the random masking strategy, then constructing the dictionary and model input of the training data, then defining a loss function and optimizing the model parameter variables by constructing a neural network optimizer. The training framework of the neural network can be adjusted according to actual needs, and there are also a large number of implementation manners in the related art. In order to facilitate understanding, the specific implementation manners thereof are exemplified in the present disclosure.

(1) The Natural Language Training Program that Defines the Random Masking Strategy The natural language training program based on the random masking strategy is designed as: randomly masking some characters in the sequence of the input address text, which are represented by masking symbols. The masking symbols refers to characters that do not normally appear in the Chinese addresses text, and they can be selected as needed. Then a part of the masking symbols in the address text sentence are replaced with real characters, then another part of the masking symbols in the address text sentence are replaced with wrong characters, and the rest of the masking symbols remain unchanged. However, the masking symbol characters will affect other characters, and if too many characters are masked, an effect of the masking symbols during the semantic feature extraction will cause attention calculation deviation of other content; however, if only one character is blocked for each sentence of the text, the number of steps required for model training will increase sharply, resulting in a serious waste of time. Therefore, the specific number of the masking symbols needs to be adjusted and optimized according to actual conditions.

In order to facilitate operation and avoid useless overhead in calculations, during the training, the language model target task module will not calculate all information output by the semantic feature extraction module, while only neuron output at positions of characters that need to be calculated for the conditional probability is extracted. Therefore, in the training process of the address language model, the target task module is only executed on these 3 kinds of characters (including characters that are still the masking symbols, and characters that are replaced by other characters after being replaced by the masking symbols) replaced by the masking symbols.

For ease of understanding, here an address text "Zhe Jiang Province Hang Zhou City Shang Cheng District Fu Xing Nan Street Qing Yi Hua Yuan 6 Zhuang 3 Dan Yuan 402 Shi" (it should be noted that this is a word-to-word translation for a Chinese address, and for ease of understanding, here is an illustration of this address, please note that, Chinese address is different from US address, in fact, the Chinese address is a description from a larger area to a smaller area without any comma, for example, for US expression, the address shall be "Shang Cheng District, Hang Zhou City", and correspondingly for Chinese expression, the address shall be "Hang Zhou City Shang Cheng District"; and with this background information, the Chinese address herein can be expressed as "Zhe Jiang Province Hang Zhou City Shang Cheng District Fu Xing Nan Street Qing Yi Hua Yuan 6 Zhuang 3 Dan Yuan 402 Shi" for ease of later description) is taken as an example to illustrate the specific implementation process.

First, 15% of the characters in the input sentence are randomly masked and represented by a word "mask", Since the word will not normally appear in the Chinese addresses text, it will not interfere with the real characters, and it can be understood as an expression of "blank" in the cloze, and a replacement position is indicated by an underline, for example:

Zhe Jiang mask Hang Zhou City Shang Cheng District mask Xing Nan Street Qing Yi mask Yuan 6 Zhuang 3 Dan Yuan 402 Shi Zhe mask Province Hang Zhou City Shang Cheng District Wang mask Jia Yuan Dong Yuan 18 Dong 3 Dan mask 601 Shi In addition, considering the development of follow-up tasks and robustness of the model, 10% of the mask in the masking symbols are replaced with real characters, and 10% of the mask content are replaced with wrong characters, for example:

80%: Zhe Jiang Province Hang Zhou City Shang mask District Fu Xing Nan Street Qing Yi Hua Yuan 6 Zhuang 3 Dan Yuan 402 Shi 10%: Zhe Jiang Province Hang Zhou City Shang Cheng District Fu Xing Nan Street Qing Yi Hua Yuan 6 Zhuang 3 Dan Yuan 402 Shi 10%: Zhe Jiang Province Hang Zhou City Shang Qing District Fu Xing Nan Street Qing Yi Hua Yuan 6 Zhuang 3 Dan Yuan 402 Shi In the actual training process of the ALM, the probability statistics calculations of the target task are not performed on all character self-attention semantic information SA, and the target task operation is only performed on the above 3 types of replaced characters.

(2) Constructing Model Input

The model input is divided into dictionary construction and input data construction.

The dictionary provides a searching basis for all the characters involved in the model, and its structure is a sequence of key-value pairs from <index number (key)> to <character (value)>, which can be obtained by traversing the text content of all addresses. In addition, two key-value pairs need to be newly constructed, values of which are respectively "mask" and "OOV" (out of vocabulary), for representing blanks in the text and characters outside the dictionary.

In the present disclosure, the address text dataset needs to be collected in advance as the basis for constructing training data. The training data is input that can be recognized by the training framework after the original Chinese addresses text is processed. When constructing the training data, the characters are directly converted into corresponding dictionary index number, and a sentence is expressed in a form of an integer vector, a shape of which can be expressed as:

inputData(batch_size,sentence_size,embedding_size)

where batch_size represents a sample size for performing mini-batch gradient descent during each training; sentence_size is a sentence length, and embedding_size is the length of the word embedding vector. To ensure the consistent sentence length, a padding method is adopted, first, the maximum sentence length in the data is found, and if the sentence constructing the training sample is smaller than the maximum length, an index number 0 is added at an end.

In addition, for the position information of the masked characters, the content of the masked characters and the sequence of all the characters, vectors are also constructed by the above method and transmitted in as the input data during the training.

(3) Defining the Loss Function

According to the ALM output, the conditional probability distribution $P(X|SA_i)$ of the predicted character of the context semantics of the mask position is obtained, a training target is to make the conditional probability of the corresponding character at the dictionary index number approach 1, that is, $P(x_i|SA_i) \to 1$, this function is only expressed for a single mask, output in the actual model training process is in a matrix form, its shape is prob(batch_size, max_mask_size, voc_size), the input of the model training also contains correct information true_ids(batch_size, max_mask_size) corresponding to the mask in the corresponding sentence, and through a gather slice operation, a value of true_ids is used as the index of prob for content search, to obtain a conditional probability matrix true_prob for predicting the correct character:

true_prob(batch_size,max_mask_size)=gather(prob, true_ids)

If true_ids contains a 0 element, the value of its corresponding tirueprob element is also set to 0.

true_prob is converted to a logarithmic probability, and a value interval is $(-\infty, 0]$:

true_prob=log(true_prob)

An objective function under the training framework is to add all non-zero elements in true_prob and take an average value so that the result is as close to 0 as possible:

$$\frac{\sum_{x \in true\_prob} x}{\sum_{x \in true\_prob} d(x)} \to 0, d(x) = \begin{cases} 1 & x \neq 0 \\ 0 & x = 0 \end{cases}$$

After adding all the non-zero elements in true_prob and taking a negative number of the average value, to get definition of the loss function:

$$LossFunction = \frac{\sum_{x \in true\_prob} x}{\sum_{x \in true\_prob} d(x)}, d(x) = \begin{cases} 1 & x \neq 0 \\ 0 & x = 0 \end{cases}$$

(4) Determination of Hyperparameters

In this embodiment, the hyperparameters include training sample size batch_size, learning rate η, the number of training round epoch, dictionary size voc_size, maximum sentence length max_sentence_size, maximum number of masked words max_mask_size, word embedding length embedding_size, the number of semantic feature extraction modules num_self_transformer_module, the number of self-attention heads attention_head_size and so on. It is necessary to comprehensively determine values of the hyperparameters during the model training according to data content, volume, and hardware resources.

(5) Constructing a Neural Network Optimizer (Optimizer)

The neural network optimizer is concrete realization of a gradient descent method and a gradient update operation, for updating the neural network parameter variable inside the model to make it approximate or reach an optimal value, thereby minimizing a result of the loss function. In this embodiment, three gradient update optimization strategies can be introduced, namely learning rate decay, clip by global norm, and adaptive moment estimation (Adam).

S43: after constructing the above training framework, the training can be performed on the address language model based on the framework and the corresponding training data, so that the model can output the semantic feature vector expression of each of the characters in the address text.

(6) ALM Model Semantic Output

After the model is trained, all internal parameter variables have been fitted to the objective function, and it can be known from the construction of the feature extraction module of the ALM that the output of the feature extraction module is the semantic feature vector of each of the characters, that is, the semantic feature expression of the Chinese addresses to be obtained by the present disclosure.

The semantic vector of each character of any address data can be obtained through the trained ALM model. On this basis, the sentence semantic vector, as a comprehensive expression of the semantic features of the entire sentence, is defined by the present disclosure as follows: in the optimization task involving the adjustment of model parameter variables, the semantic feature of the address sentence is an average of a sum of the semantic vectors of all characters in the address text. The semantic features of the address sentences can be expressed as a following formula:

$$Setence\_SA = \frac{\sum_{i=1}^{n} sa_i}{n}$$

where: n is the total number of characters in the address text.

The human brain has geospatial feature associations for an address text, that is, when answering address-related questions, it will have a general impression of a location of the address, which is fundamentally different from a thinking manner of the traditional natural language. The aforementioned ALM semantic feature output can capture a semantic relationship of the characters in the address text and output it in vector form, but it has not yet syncretic with the spatial semantic features, so it is necessary to further design a weighted clustering method for address semantics and geospatial that conforms to human thinking, takes an address position as the target.

In the present disclosure, the weighted clustering for the address semantics and space is implemented through the step S5, and a specific implementation process is as follows:

S51: obtaining output $SA^N$, $SA^{N-1}$, $SA^{N-2}$, $SA^{N-3}$ of the address text from the last four layers of the self-transformer sub-modules in the feature extraction module, and performing average pooling and max pooling on $SA^N$, $SA^{N-1}$, $SA^{N-2}$, $SA^{N-3}$, respectively. Obtaining values of the entire sentence text, assuming that the length of the sentence is L, the number of the character semantic features is S, and the character content is stored in an L×S two-dimensional array charEnibed[L, S]:

avg_sentEmbed[i]=avg(charEmbed[0:L][i])

max_sentEmbed[i]=max(charEmbed[0:L][i])

where: i∈[0,S−1]

The average pooling considers all the character information contained in the sentence, while the maximum pooling focuses on key characters and salient representations in the sentence, so in order to take into account the above advantages, the present disclosure combines these two pooling methods, adds the address text representations obtained by the average pooling and the maximum pooling respectively, and finally obtains a sentence vector expression having the same length as the word vector:

sentEmbed=avg_sentEmbed+max_sentEmbed

Moreover, the ALM structure contains a plurality of the Self-Transformer Modules, the sentence vector obtained from the output of each layer contains semantic information in different perspectives, and, it is found that, through research related to a BERT language model similar to the ALM structure, output of its encoder (the semantic extraction module in the BERT language model) has following performances in a task of named entity recognition: concatenate the last four layers>sum the last four layers>others, whereas the concatenation operation in the present disclosure will cause a dimensional disaster. Therefore, a manner where pooling results sentEmbed of the last four layers of the Self-Transformer Module are added is used to obtain the vector expression of the final address text, that is, in the present disclosure, the two kinds of pooling results (a total of 8 results) output from the last four layers are all added to obtain the final semantic feature expression sentEmbed$_0$ of the address text.

S52: using the semantic sentence vector and coordinate of each address text as feature information, and merging the two:

in order to unify a standard, a Euclidean distance is used as a unit of measurement for a difference between the semantic and the geospatial features in the address information. Calculating a Euclidean distance range sent_range of all the address texts in the semantic feature vector space and a Euclidean distance range coor_range in the geospatial feature vector space, respectively. Assuming that the number of the text semantic features is S and the address data set is D, and it can be expressed as a following equation:

$$\text{sent\_range} = \max\left(\sqrt{\sum_{i=1}^{S}(sentEmbed_{d1\in D}[i] - sentEmbed_{d2\in D}[i])^2}\right)$$

$$\text{coor\_range} = \max\left(\sqrt{\sum_{i=1}^{2}(coorEmbed_{d1\in D}[i] - coorEmbed_{d2\in D}[i])^2}\right)$$

by dividing a value of one range by a value of the other range, a ratio between their magnitudes can be approximately obtained, to realize a dimension-removing operation of the features of the two, and in order to highlight a certain feature of the address information, the dimension-removed feature vector can be weighted (here λ means weight), to obtain the processed semantic feature vector sentEmbed and spatial feature vector coorEmbed:

$$sentEmbed = sentEmbed * \frac{sent\_range}{coor\_range} * \lambda$$

$$coorEmbed = coorEmbed * (1 - \lambda)$$

directly splicing these two kinds of feature vectors, to form a fusion feature vector having a length of S+2:

concatEmbed={sentEmbed,coorEmbed}

The weight λ between the semantic features and the spatial features will change an application effect of the final fusion vector. In general, the semantic features and the geospatial features have a mutually restrictive relationship: if the semantic weight is set to be too large, address elements that are far away in space still have the same category, to result in geospatial dispersion of clustering, thereby reducing the geospatial accuracy of a subsequent GSAM model; if the geospatial weight is too large, the semantic information of the address will be lost, such that the clustering will lose an ability to divide urban functional blocks, to result in a result that is not in line with human cognition, thereby reducing the ability of the GSAM model to understand the semantics of the address text.

S53: through the K-Means clustering algorithm, clustering the fusion feature vectors of all address texts, to obtain the semantic-geospatial fusion clustering result. In order to improve the performance of the clustering, the present disclosure adopts Elkan's distance calculation optimization algorithm, the algorithm uses a distance between cluster centers as a side of a triangle, and triangular inequality is used to simplify a calculation process of the clustering, to reduce unnecessary distance calculation. Moreover, Mini-Batch K-Means, a variant of the K-Means, is also used to improve a speed of the clustering. Mini-Batch K-Means uses a way of randomly selecting a small batch of data subsets to reduce the calculation time, and compared with the traditional K-Means where it is necessary to calculate all the elements before updating the cluster centers, in each iteration, it only randomly selects an element set having a specified sample size, and then updates the cluster center according to elements in the set. In addition, because the K-Means objective function has a local minimum point, it is easy for the algorithm to fall into a local optimal solution, then in order to make the clustering results as close to a global optimal solution as possible, initialization of the cluster centers is particularly critical. The present disclosure uses a K-Means++ cluster center initialization scheme proposed by Arthur and Vassilvitskii (2007), to improve an error of the clustering results. A core idea of this algorithm is to make the distance between the cluster centers as far as possible when initializing the cluster centers.

After obtaining the clustering result where the address text semantic and the space are syncretic, each piece of the address texts Kw, is assigned a clustering result label $B_i$, to obtain address text and classification label data sets W {$W_1$, $W_2$, $W_3$, ... } and B {$B_1$,$B_2$,$B_3$, ... } respectively. On this basis, a new neural network structure target task can be defined subsequently, that is, to correctly predict the clustering result of each of the address texts, and W and B are used as experimental data, to design a migration learning model and the training framework, to construct a geospatial-semantic address model (GSAM) having an ability of the fusion feature extraction.

In the following, the GSAM model is constructed in step S6, aiming to achieve the semantic-geospatial fusion of the ALM, and starting from the fine-tuning theory of the neural network language model. A specific execution flowchart is as follows:

S61: transplanting the word embedding module and the feature extraction module in the address language model trained in S4 (multiplexing the ALM structure), connecting the two to form an encoder. During the transplantation, the neural network parameter variable remains unchanged.

Therefore, in the encoder of the GSAM model, the word embedding module and the feature extraction module are consistent with the ALM model, and each layer of the self-transformer sub-module of the feature extraction module can output corresponding semantic feature variables. However, the original target task module cannot achieve a target of classification of the address text, so it is necessary to reconstruct an address text classifier through following steps.

S62: reconstructing a target task module that is used to classify the address text as a decoder, for generating a probability distribution for output of the encoder through the neural network. A specific execution flowchart in the decoder is:

first, performing the average pooling on the output $SA^N$ of the last layer of the self-transformer sub-module of the feature extraction module in the encoder, and the pooling result serving as the semantic feature of the address sentence.

Then performing, through the feed forward network layer, nonlinear transformation on the semantic feature of the address sentence, to convert the semantic feature into the probability distribution feature of a classification problem and preserve the input semantic feature number S, and the number of output probability distribution features is still S, wherein an activation function uses tanh. An output gradient interval of this function is (−1, 1), and compared with a disadvantage in the ReLU where a negative gradient is set to zero, it can preserve the activation state of the neurons as much as possible, although a convergence effect is not as good as ReLU, since the network structure of the target task is relatively simple here, and this layer is close to the final output layer of the model, using this as the activation function has a better effect.

Then the obtained probability distribution feature is converted into the probability score distribution of the address text through the fully-connected-layer. The weight matrix and the offset of the neuron are both training parameter variables, which are initially assigned in a random manner.

Finally, the probability score distribution score is substituted into the softmax function, to obtain the predicted probability distribution P (B W) of the address text belonging to each cluster (the cluster category is obtained in S5).

Figure 4:
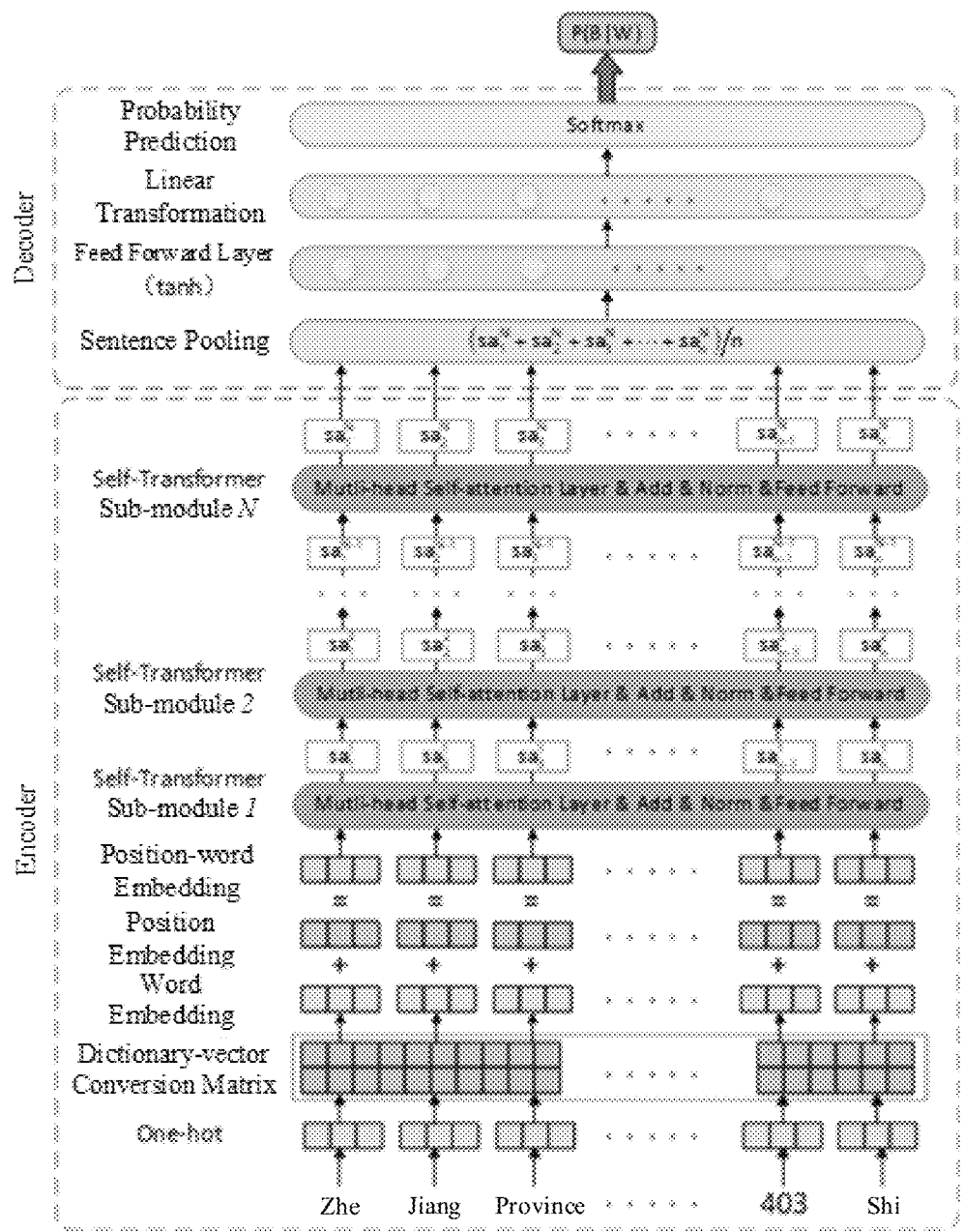
FIG. 4 is a structural diagram of the geospatial-semantic address model (GSAM) of the present disclosure.

Using the encoder and the decoder above, the geospatial-semantic address model can be constructed (the structure is shown in FIG. 4), and combined with its target task, a model training framework for the address text classification is developed. It is specifically implemented through step S7, and a specific execution flowchart is as follows:

S71: connecting the encoder and the decoder, to obtain the complete structure of the geospatial-semantic address model GSAM.

S72: constructing the training framework for the geospatial-semantic address model, and training the geospatial-semantic address model based on the training framework, such that the model can output the fusion vector expression of the semantic and spatial features for the address text.

The training framework of the geospatial-semantic address model is as follows:

(1) Model input and hyperparameter construction

The training data input includes the address text data set and the cluster label corresponding thereto, the text data set is used for input during the training, the cluster label represents a correctly corresponding index value in the probability distribution output by the model, and it is a supervision basis for judging the quality of the model. Moreover, since the number in the address text is related to the spatial position, it cannot be ignored, and it is necessary to add the numbers that appear in the text data to the dictionary, and the neural network parameters of a transplanted ALM model instance should also be the model training results that have not been replaced with NUM.

The hyperparameters during training are similar to those of the ALM model, including training sample size batch_size, learning rate 9, dictionary size, the number of the classification label num_labels, the number of training round epoch, the number of test interval step train_interval; in addition, it also includes maximum sentence length max_sentence_size, word embedding length embedding_size, the number of semantic feature extraction modules num_self_transformer_module, the number of self-attention heads attention_head_size, these hyperparameters are all hyperparameters during the ALM training, and here, they are strictly consistent with the ALM model instance where the transplanted parameter variables are located.

(2) defining a training program that maximizes the predicted classification probability, to make a correct label probability of the address text output through the model as large as possible, such that the parameter variables inside the model are continuously fitted to the correct classification results.

(3) defining the loss function for the model training.

The number of the address texts for each training is batch_size, the probability output of the model is prob (batch_size, num_labels), and combining with the true label sequence B (batch_size) of the sample, the true label probability of each sample is obtained.

$$\text{true\_prob}(\text{batch\_size}) = \text{gather}(\text{prob}, B)$$

By adding the logarithmic value of the probability and taking an average value, an expression of the objective function in the training framework can be obtained:

$$\frac{\sum_{i=1}^{batch\_size} \log(\text{true\_prob}[i])}{batch\_size} \to 0$$

By adding the logarithmic value of the probability and taking an average negative value, an expression of the loss function of the training task can be obtained:

$$LossFunction = -\frac{\sum_{i=1}^{batch\_size} \log(\text{true\_prob}[i])}{batch\_size}$$

(4) combining the model training framework and the input training data to train the GSAM model. After obtaining the trained GSAM model, the address text can be input into the model, and the fusion vector expression of the semantic-geospatial features can be output. In the output fusion vector contains both the semantic features and the spatial features and thus have semantic-geospatial fusion properties. Such fusion vectors have a wide range of application scenarios and can be used to construct various downstream tasks in the address space.

Hereinafter, based on the above method, it is applied to Embodiment 1 to visually demonstrate its technical effect.

Embodiment 1

In this embodiment, nearly 2 million pieces of Chinese addresses data in Shang Cheng District in Hang Zhou City are used to construct the address corpus, and the feature vector extraction is performed on it. Basic steps thereof are as described in the aforementioned S1~S7 and will not be repeated, and the following mainly demonstrates some specific implementation details and effects of each step.

1. According to the method described in steps S1~S7, using a TensorFlow deep learning framework to construct the ALM and the GSAM, and setting a save point of the model, to save the neural network parameter variable except the target task module, to facilitate the transplantation in the next fine-tuning task; the hyper-parameters of the model are set through a configuration file hype-para.config, and a specific content mainly includes following categories:

1) training sample size batch_size: 64; 2) initial learning rate η: 0.00005; 3) the number of training round epoch: 3; 4) dictionary size voc_size: 4587; 5) maximum sentence length max_sentence_size: 52; 6) the maximum number of masked words max_mask_size: 7; 7) word embedding length embedding_size: 768; 8) the number of semantic feature extraction modules num_self_transformer_module: 6 to 12; 9) the number of self-attention heads attention_head_size: 12; 10) the number of classification labels num_labels: 500; 11) the number of test interval steps train_interval: 500.

2. Constructing a related dictionary for the text content of the Chinese addresses in Shang Cheng District in Hang Zhou City, generating a randomly masking result according to a construction method of the ALM training data, taking 1% of them, that is 20,000 pieces of the content, as a test set, and taking the rest as a training set.

3. Carrying out ALM instance training for the address data of Shang Cheng District in Hang Zhou City, saving the model instance every 500 steps, and verifying a verification set once, and using the TensorBoard plug-in to draw the training gradient curves and the test gradient curve, to determine whether the model has over-fitting or under-fitting, finally selecting a save point having the highest verification accuracy as the model generation result, and output of the Self-Transformer sub-module in the feature extraction module is the semantic feature vector of the address text. Taking the number of the semantic feature extraction modules as a variable and setting it to 6, 8, 10, and 12 respectively to train the model instance, comparison indicators are as follows:

| Index item | Number of semantic extraction modules | Training time | Loss value of training data | Average loss value of verification data | Accuracy |
|---|---|---|---|---|---|
| Index value | 6 | 5 h 59 m 28 s | 0.4029 | 0.3703 | 90.41% |
| | 8 | 7 h 32 m 30 s | 0.3889 | 0.3632 | 90.52% |
| | 10 | 9 h 25 m 30 s | 0.3578 | 0.3565 | 90.63% |
| | 12 | 11 h 10 m 41 s | 0.3423 | 0.3509 | 90.79% |

Figure 5:
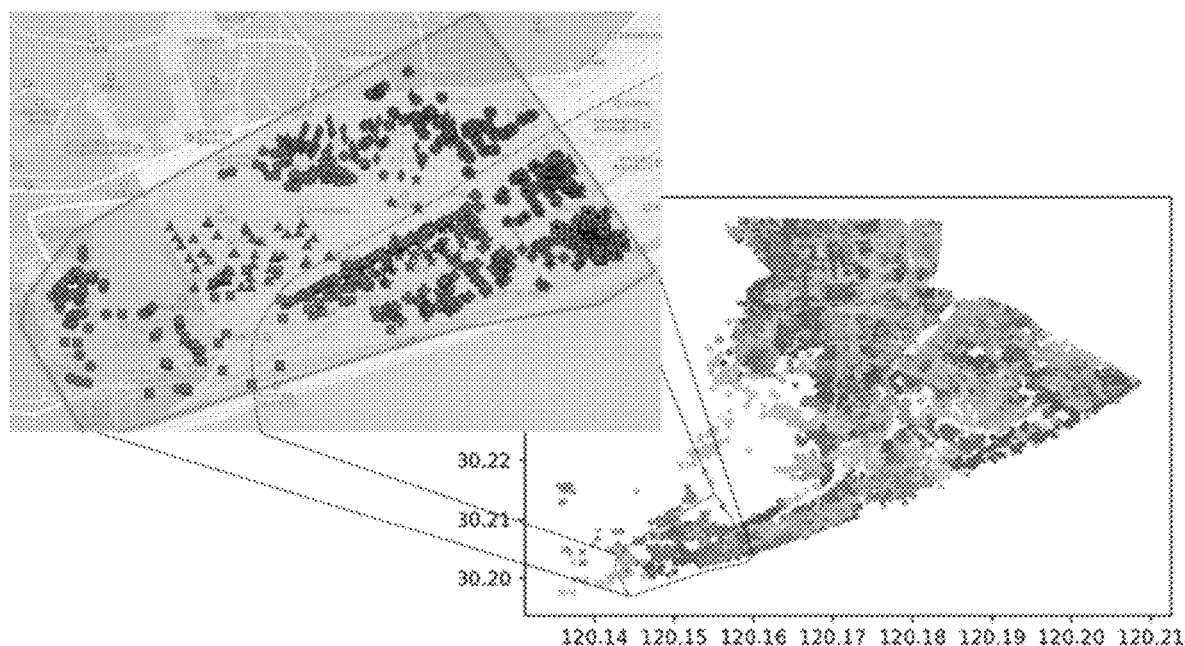
FIG. 5 shows semantic-geospatial weighted clustering results of address elements of the present disclosure (semantic weight 0.4/geospatial weight 0.6)

The final verification accuracy of the four types of model instances are all around 90.5% and increasing in an order of the number of the semantic modules, and the average loss value and the accuracy show a negative correlation trend. From the loss value obtained from the training model, a difference between it and the loss value of the verification data set is very small, so it can be basically determined that none of the above four models has over-fitting and under-fitting. In term of the training time, as the number of the modules increases, the training time also increases. However, even for the model consuming the longest time, burden brought in actual training is still within an acceptable range. Moreover, the addition of the semantic extraction module can better improve the ability of the model to extract the semantic features of the address text, making the semantic output of the module of each layer more linear. Based on conditions of all the indicators above, it is determined that 12 extraction modules can bring the best target task results and semantic feature extraction effects to the model;

4. according to the aforementioned clustering method, carry outing fusion clustering on the semantic feature sentence vector and geospatial coordinate information of the address text, set the number of the clusters to 500 based on division of city functional areas (e.g., residential quarters, commercial areas, and key roads), performing clustering experiments and comparisons by adjusting the weights of the semantic feature vector and the geospatial feature vector, and it is finally found that experimental data is in a weight distribution mode where the weight of the semantic feature vector is 0.4 and the weight of the geospatial feature vector is 0.6 (that is, A is 0.4), the clustering result is shown in FIG. 5, and this result is most consistent with human cognition. Recording the clustering result label of the address text at this time, and establishing an association with the address text.

5. Transplanting the neural network parameter variable in the save point obtained in the third step to the GSAM model, to construct a verification set and a test set (the address content is not masked, and an integer vector of the serial numbers of all characters in the text), the content of the data set including the address text information and the clustering label results, and the ratio remaining at 1% (not less than 10,000) and 99%.

6. To maximize the predicted classification probability as a target, carrying out GSAM model instance training for the address data of Shang Cheng District in Hang Zhou City, saving the model instance every 500 steps, and verifying a verification set once, drawing the training gradient curve and the test gradient curve, to determine whether the model has over-fitting or under-fitting, finally selecting a save point having the highest verification F1 value as the model generation result, and output of the Self-Transformer sub-module in the feature extraction module is the semantic-geospatial fusion feature vector of the address text. From change of the gradient curve of the training data set, the loss value of the model instance has a relatively rapid descending trend before 20 k steps, then the descent process slows down and there is a small local oscillation, it gradually stabilizes after 100 k steps, the loss value keeps oscillating between 0.18 and 0.01, and after smoothing, it is basically in a range of 0.08 to 0.05, so it can be considered that the GSAM instance has reached a training requirement at this time. States of the loss gradient curves of the validation set and the training set are almost the same, which are still a trend expression of "rapid descend-slow descend-steady oscillation". However, in terms of the loss value after stabilization, the validation set is between 0.1293 and 0.1271, having a certain gap with a center of the test set curve, and it can be seen that the model instance has a slight overfitting phenomenon during training, so it is necessary to comprehensively consider the evaluation index curve of the test data after 100 k, so as to select the optimal training state point as the generation instance of the model. The curve change of the verification indicator is the negative correlation expression of the loss curve, it showed a rapid rising trend in an early period of the training, the accuracy rate and the Macro-F1 classification performance reach 0.9457, 0.9308 and 0.9458 respectively at 20 k steps, then they began to rise slowly, until when between 100 k and 120 k, index ranges of the three are stable at 0.9696-0.9711, 0.9593-0.9614 and 0.9698-0.9711 respectively, and it is accompanied by small fluctuations, since the ranges of the above three intervals are already very small, it can be considered that the model has reached the training requirements at this time, and a better step length point is taken as a generation instance of the model. Based on the above situation, the experiment decided to minimize an overfitting gap between the training set and the validation set of the model in a range of ensuring the model training effect, and the verification index curve within this range is already stable, so it will not have much impact on the model effect. In the final experiment, the save point of the model instance at 115.5 k is selected as the model generation instance GSAM_Format, the loss values of the training set and the test set are 0.128 and 0.1176 respectively, and the verification accuracy, the macro F1 value and the micro F1 value at this time are 0.9706, 0.9607 and 0.9710 respectively. Judging from the classification effect of GSAM_Format on the target task, the three indicators of the verification set all reached above 0.96, showing that this model instance can well realize the label recognition of the clustering results, so it can be considered that it has efficient and accurate classification capabilities; analyzing from the model structure, its feature extraction module can output the semantic-geospatial fusion features through training, to provide support for address-related downstream projects. Moreover, the GSAM can assign geospatial characteristics of clustering granularity to the numbers in the address text, the output address text can be expressed in the form of the semantic-geospatial fusion features, and this is something that ALM and other natural language models do not have.

In the following, another embodiment is given to provide a downstream task implementation method developed based on the fusion vector extracted by the method, so as to facilitate a better understanding by those skilled in the art.

Embodiment 2

This embodiment provides a method for predicting a geographic position of an address text. A purpose of this method is to realize association between a place name mentioned in the address text and geospatial coordinates corresponding thereto, to construct a joint expression of the two, that is, "to predict coordinates of a geospatial entity mentioned in a document based on a content of the address text".

Figure 6:
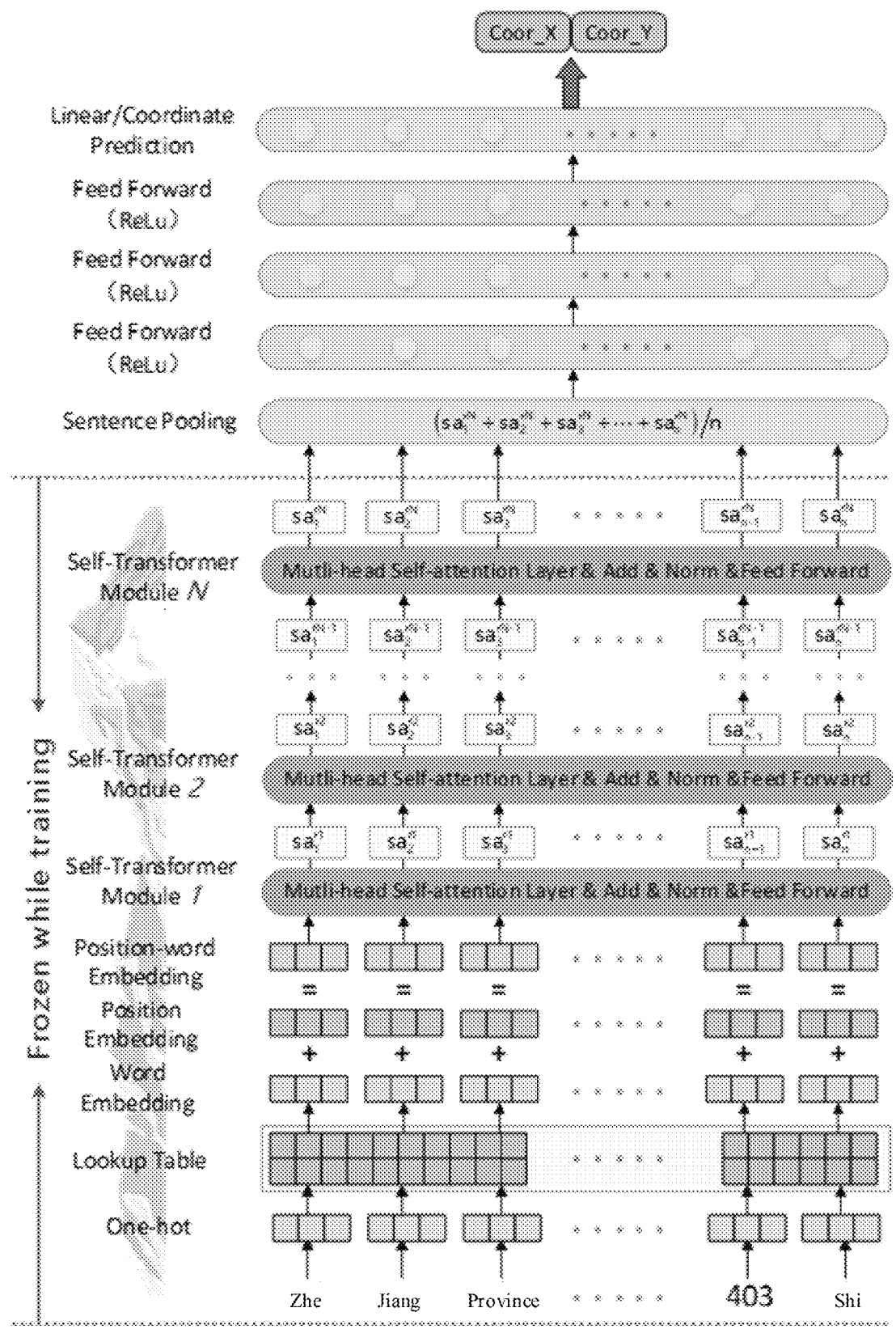
FIG. 6 is a structural diagram of the address coordinate prediction model.

Specific steps of the method for predicting a geographic position of an address text in this embodiment are as follows:

first, constructing an address space coordinate prediction model; wherein the address space coordinate prediction model includes three consecutive fully-connected-layers and a linear transformation layer, an geospatial-semantic address model is obtained based on the method described in S1~S7, and the output $SA^N$ of the last layer of self-transformer sub-module of the feature extraction module is pooled by a pooling layer and then is sequentially input into the three consecutive fully-connected-layers and the linear transformation layer, and the predicted coordinates of the geospatial entity described by the output address text is output. The overall structure of the model is shown in FIG. 6.

Then inputting the address text of the geographic position to be predicted into the trained address space coordinate prediction model, to obtain the predicted coordinates of the geospatial entity described by the address text.

This model, through setting the three fully-connected-layers as hidden layers of the target task module and linearly transforming the result, realizes binary output of the predicted coordinates, and the input of this module is the output of the feature extraction module in the GSAM model. In the implementation process, the GSAM model (GSAM_Format) is constructed and trained according to the aforementioned S1~S7 and the method described in the Embodiment 1, then after the output of $SA^N$ the last layer of the self-transformer sub-module of the feature extraction module is pooled by the pooling layer, it is input into three consecutive fully-connected-layers in sequence, so that the model can retain more semantic-geospatial to coordinate conversion related information, and the ReLU is used as the activation function to ensure the convergence effect during training. The output result of the neuron in the last layer already has features of the predicted coordinates, but the number of the features does not match dimensions of the geospatial coordinates, so the linear transformation layer is required to realize a dimensionality reduction operation, and the output result is the predicted coordinates of the geospatial entity described by the address text.

The address coordinate prediction model needs to be trained before it can be used for prediction. But it should be noted that during training, some of the variable parameters of the encoder in the GSAM model, that is, the neural network parameters before the task target module need to be frozen—Frozen While Training, and the gradient descent operation is not performed on the above parameter variables when performing back propagation.

Model Input and Hyperparameter Construction

The training data input includes the address text data set and real coordinate information corresponding thereto, the text data set is used for the input during the training, and the real coordinate information is used to evaluate the predicted coordinates output by the model, and it is a numerical basis of the gradient descent when guiding the model training. Moreover, because the feature extraction module in the model is migrated from the GSAM model instance obtained by the training, it is necessary to obtain the GSAM instance to assign a relevant neural network parameter variable, and the dictionary during training is also consistent with the model instance.

The definition and assignment of the hyperparameters during training are as follows:

(1) Training sample size batch_size: 64.
(2) Learning rate η: $1 \times 10^{-4}$ (initial learning rate).
(3) Dictionary size: consistent with the dictionary size used in the geospatial-semantic address model instance, where the dictionary should contain all numeric enumerations in the address text.
(4) Number of training rounds epoch: 5.
(5) The number of test interval steps train_interval: 500.
(6) Other related hyperparameters for the ALM training (max_sentence_size, embedding_size), which are consistent with the values set in the GSAM instance.

Defining the specific content of the training program: making the predicted value of the coordinate after the address text is output by the model and a true value as close as possible, such that the parameter variables inside the target task module are continuously fitted to the correct results.

The number of the address texts for each training is batch_size, so the training target can be defined in such a way that an average value of the sample distance error is 0 and the output of the model is pred_coord (batch_size,2), and, combining the geospatial coordinate sequence true_coord (batch_size,2) of the sample, the objective function expression in the training framework can be obtained, where dis(x) represents a geospatial distance measurement function:

$$\frac{\sum_{i=1}^{batch\_size} dis(\text{true\_coor}[i], \text{pred\_coor}[/])}{batch\_size} \to 0$$

From this, the loss function for model training can be obtained:

$$LossFunction = \frac{\sum_{i=1}^{batch\_size} dis(\text{true\_coor}[i], \text{pred\_coor}[i])}{batch\_size}$$

In order to compare the effects of the present disclosure, in addition to constructing the prediction model based on the GSAM_Format, this embodiment also constructs and trains two comparative model instances. A model structure of one of them is consistent with that of this embodiment, but in terms of feature extractor, ALM_Format is used to assign a value to the neural network parameter variable outside the target task module, and in this case, a feature expression of this model instance only contains the semantic information of the address text; the other one of them uses a Word2Vec method to express the address text in a vector, and its target task module is the same as the downstream task model and also uses the three layers of fully connected neural network as hidden layers, to finally obtain the output by linear change. The two sets of comparison models both only perform gradient update operations on the neural network parameters in the target task module during training. The dimensionality of the hidden layer is a variable, and it is sequentially set to 768/768/768, 1024/1024/1024, 2048/2048/2048 and 4096/4096/4096 to carry out training of the downstream task model and the comparison model instance.

A step length point of an optimal effect after convergence for the training model is saved as the final instance of the model, and in this case, model evaluation indicators are summarized as follows:

| Dimensionality of hidden layer | Model classification | Index item | | |
| --- | --- | --- | --- | --- |
| | | mean (meter) | mid (meter) | min (meter) |
| 768 | based on GSAM_Format | 294.3 | 243.5 | 3.603 |
| | based on ALM_Format | 1285.0 | 1131.2 | 9.204 |
| | based on Word2Vec | 762.1 | 602.1 | 2.453 |
| 1024 | based on GSAM_Format | 270.3 | 220.5 | 1.714 |
| | based on ALM_Format | 1248.0 | 1106.0 | 9.957 |
| | based on Word2Vec | 690.6 | 527.6 | 3.005 |
| 2048 | based on GSAM_Format | 227.7 | 181.2 | 1.159 |
| | based on ALM_Format | 1190.0 | 1046.0 | 13.750 |
| | based on Word2Vec | 524.7 | 368.9 | 3.300 |
| 4096 | based on GSAM_Format | 194.5 | 149.0 | 1.118 |
| | based on ALM_Format | 1170.0 | 1021.0 | 6.166 |
| | based on Word2Vec | 445.1 | 298.9 | 2.058 |

From analysis of the above three indicators and curve changes, the prediction model based on GSAM_Format aims at sample address information, and, regardless of whether it is comprehensive or partial, its ability to predict the geospatial coordinates is far better than that of the other two types of models, and it can efficiently and accurately complete the process similar to the human brain from "address text recognition" to "geospatial region perception". This also proves from the side that the GSAM model of the present disclosure does have the learning ability of the semantic-geospatial fusion features, and its training instance includes semantic-geospatial fusion weights.

The above embodiment is only a preferred solution of the present disclosure, but it is not intended to limit the present disclosure. Those of ordinary skill in the related art can make various changes and modifications without departing from the spirit and scope of the present disclosure. Therefore, all technical solutions obtained by equivalent substitutions or equivalent transformations fall within the protection scope of the present disclosure.

What is claimed is:

1. An address information feature extraction method based on a deep neural network model, the method comprising steps of:

S1: constructing a word embedding module weighted by a position order, for expressing, through a position coding algorithm and a built-in matrix variable, each address character in an input address text in a form of a unique-value vector, to achieve conversion of address information from text to code;

S2: constructing a feature extraction module for character encoding, and obtaining, through a semantic extraction method of a multi-head self-attention mechanism, a comprehensive semantic output of a character element in different semantic spaces;

S3: constructing a target task module that predicts unknown characters based on context, and outputting, under a condition of satisfying that the address character and the context represent a mapping relationship, a conditional probability distribution of predicted characters required by the training task;

S4: connecting the word embedding module in the step S1, the feature extraction module in the step S2 and the target task module in the step S3 in sequence, to form a Chinese addresses language model, and training the Chinese addresses language model using a natural language training program based on a random masking strategy, such that the model outputs and obtains a semantic feature vector of each character in the address text;

S5: synthesizing the semantic feature vectors of all the characters in the address text, obtaining a sentence vector through a pooling method of the address semantic features, performing high-dimensional weighting in combination with geospatial position information, and obtaining a semantic-geospatial fusion clustering result through a K-Means clustering method;

S6: transplanting the word embedding module and the feature extraction module in the Chinese addresses language model trained and completed in the step S4, to form an encoder; reconstructing, based on a neural network fine-tuning theory, the target task module, to form a decoder, for using the clustering result in the step S5 as an address text label, to assign a semantic-geospatial fusion weight to a neural network parameter variable in the encoder; and S7: combining the encoder and the decoder to construct a geospatial-semantic address model, and training the geospatial-semantic address model, such that the model can output the fusion vector expression of the semantic and geospatial features for the address text, wherein in the step S2, a specific execution flowchart in the feature extraction module comprises steps of:

S21: inputting a character vectorization expression content output by the word embedding module in the step S1 into a neural network formed by series connection of multiple layers of self-transformer sub-modules; in each layer of the self-transformer sub-module, input data is first substituted into a self-attention neural network, output thereof undergoes a residual and normalization calculation and then is substituted into a feed forward network layer, and then undergoes another residual and normalization calculation and then serves as output of the self-transformer sub-module; and S22: in other layer of self-transformer sub-modules except a first layer of self-transformer sub-module, output of a previous layer of self-transformer sub-module serving as input of a next layer of self-transformer sub-module, transferring layer by layer, until output $SA^N$ of the last layer of self-transformer sub-module is obtained.

2. The address information feature extraction method based on a deep neural network model according to claim 1, wherein in the step S1, a specific execution flowchart in the word embedding module comprises steps of:

S11: creating a dictionary-vector conversion matrix C;

S12: getting an index char_index of each of the address characters in the input address text in the dictionary;

S13: obtaining a one-hot vector of each of the characters according to the index, and a length of the vector being a size of the dictionary;

S14: multiplying the one-hot vector with the Lookup Table, to obtain a word embedding value $embedding_0$ of each of the characters:

S15: obtaining a position position of each of the characters in the address text;

S16: obtaining a position weight vector of each of the characters according to the position coding algorithm, wherein a position weight vector PW of each of the characters is composed of position weight values of all dimensions;

a position weight value of an even-numbered dimension is:

$$PW(\text{position}, i \mid i \ \%2 = 0) = \sin\left(\text{position} / 10000^{\frac{i}{d_{model}}}\right)$$

a position weight value of an odd-numbered dimension is:

$$PW(\text{position}, i \mid i \ \%2 = 1) = \cos\left(\text{position} / 10000^{\frac{i-1}{d_{model}}}\right)$$

where, $d_{model}$ represents a dimension of word embedding $embedding_0$, and i represents an i-th dimension that is calculated; and S17: adding the position weight vector and the word embedding value of each of the characters, to obtain a character vectorization expression content of each of the characters weighted by the position sequence:

embedding=$embedding_0$+PW.

3. The address information feature extraction method based on a deep neural network model according to claim 1, wherein in the step S3, a specific execution flowchart in the target task module comprises steps of:

S31: using output of the feature extraction module in the step S2 as input of the feed forward network layer, transforming, through nonlinear transformation, it into "corrected word embedding" information prob_embedding where each of the characters has been affected by the context, and a nonlinear transformation formula is:

prob_embedding=$g(W \times SA+b)$ where g( ) represents a ReLu function, W represents a weight matrix, and b represents linear offset;

S32: performing a linear transformation on prob_embedding, to obtain its probability distribution score:

logits=$C^T$×prob_embedding+b' where the weight matrix $C^T$ is transposition of the dictionary-vector conversion matrix C, and b' represents offset of the linear transformation; and S33: substituting the probability distribution score logits into a softmax activation function to finally obtain the conditional probability distribution where each of the characters is a respective word in the dictionary.

prob=softmax(logits)

4. The address information feature extraction method based on a deep neural network model according to claim 1, wherein a specific implementation flowchart of the step S4 comprises steps of:
S41: connecting the word embedding module in the step S1, the feature extraction module in the step S2, and the target task module in the step S3 in sequence, to form a Chinese addresses language model;
S42: constructing a training framework for the Chinese addresses language model, and in the training framework, first defining the natural language training program based on the random masking strategy, then constructing the dictionary and model input of the training data, then defining a loss function and optimizing the model parameter variables by constructing a neural network optimizer; and
S43: training the Chinese addresses language model based on the training framework, such that the model outputs semantic feature vector expression of each of the characters in the address text.

5. The address information feature extraction method based on a deep neural network model according to claim 4, wherein in the step S42, the natural language training program based on the random masking strategy specifically comprises:
randomly masking some characters in the sentence of the input address text, and representing by masking symbols; then replacing a part of the masking symbols in the address text sentence with real characters, replacing another part of the masking symbols in the address text sentence with wrong characters, and keeping the rest of the masking symbols unchanged; in the training process of the Chinese addresses language model, the target task module being only executed on the three kinds of characters replaced by the masking symbols;
wherein in the neural network optimizer, three gradient update optimization strategies, which are learning rate decay, clip by global norm, and adaptive moment estimation, are adopted.

6. The address information feature extraction method based on a deep neural network model according to claim 1, wherein a specific implementation process of the step S5 comprises steps of:
S51: obtaining output $SA^N$, $SA^{N-1}$, $SA^{N-2}$, $SA^{N-3}$ of the address text from the last four layers of the self-transformer sub-modules in the feature extraction module, and performing average pooling and max pooling on $SA^N$, $SA^{N-1}$, $SA^{N-2}$, $SA^{N-3}$, respectively, then adding all pooling results, to obtain final semantic feature expression $sentEmbed_0$ of the address text;
S52: calculating a Euclidean distance range sent_range of all the address texts in a semantic feature vector space and a Euclidean distance range coor_range in a geospatial feature vector space, respectively;

performing a dimension-removing operation on the semantic feature vector $sentEmbed_0$ and the geospatial feature vector $coorEmbed_0$ of each of the address texts, and weighting, through setting a weight value λ, the dimension-removed feature vectors, to obtain the processed semantic feature vector sentEmbed and geospatial feature vector coorEmbed:

$$sentEmbed = sentEmbed * \frac{sent\_range}{coor\_range} * \lambda$$

$$coorEmbed = coorEmbed * (1 - \lambda)$$

directly splicing the processed two kinds of feature vectors, to form a fusion feature vector:

concatEmbed={sentEmbed,coorEmbed};and

S53: clustering all the fusion feature vectors through the K-Means clustering algorithm in combination with Elkan distance calculation optimization algorithm, Mini-Batch K-means strategy and K-means++ clustering center initialization scheme, so as to obtain a semantic-geospatial fusion clustering result.

7. The address information feature extraction method based on a deep neural network model according to claim 1, wherein a specific implementation process of the step S6 comprises steps of:
S61: transplanting the word embedding module and the feature extraction module in the address language model trained in the step S4, and connecting the two to form an encoder; and
S62: reconstructing a target task module that is used to classify the address text as a decoder, for generating a probability distribution for output of the encoder through the neural network; in the decoder,
first, performing average pooling on output $SA^N$ of the last layer of self-transformer sub-module of the feature extraction module in the encoder, and the pooling result serving as a semantic feature of the address sentence;
then performing, through the feed forward network layer, nonlinear transformation on the semantic feature of the address sentence, to convert the semantic feature into the probability distribution feature of a classification problem, wherein an activation function uses tanh;
finally converting, through a fully-connected-layer, the obtained probability distribution feature into probability score distribution of the address text, and the predicted probability distribution P (B|W) of the address text belonging to each cluster obtained in the step S5 from the softmax function.

8. The address information feature extraction method based on a deep neural network model according to claim 1, wherein a specific implementation process of the step S7 comprises steps of:
S71: connecting the encoder and the decoder, to obtain the geospatial-semantic address model; and
S72: constructing a training framework for the geospatial-semantic address model, and training the geospatial-semantic address model based on the training framework, such that the model is capable of outputting fusion vector expression of the semantic and geospatial features for the address text.

9. A method for predicting a geographic position of an address text, the method comprising steps of:
first, constructing an address space coordinate prediction model; wherein the address space coordinate prediction model comprises three consecutive fully-connected-layers and a linear transformation layer, an geospatial-semantic address model is obtained based on the method according to claim 1, and the output $SA^N$ of the last layer of self-transformer sub-module of the feature extraction module is pooled by a pooling layer and then is sequentially input into the three consecutive fully-connected-layers and the linear transformation layer, and the predicted coordinates of the geospatial entity described by the output address text is output; and then inputting the address text of the geographic position to be predicted into the trained address space coordinate prediction model, to obtain the predicted coordinates of the geospatial entity described by the address text.

* * * * *